(12) United States Patent
Gitelman et al.

(10) Patent No.: US 11,481,503 B2
(45) Date of Patent: *Oct. 25, 2022

(54) TECHNIQUES FOR DETECTING EXPLOITATION OF MEDICAL DEVICE VULNERABILITIES

(71) Applicant: Armis Security Ltd., Tel Aviv-Jaffa (IL)

(72) Inventors: Shaked Gitelman, Tel Aviv (IL); Tai Ravid, Tel Aviv (IL)

(73) Assignee: Armis Security Ltd., Tel Aviv-Jaffa (IL)

( * ) Notice: Subject to any disclaimer, the term of this patent is extended or adjusted under 35 U.S.C. 154(b) by 381 days.

This patent is subject to a terminal disclaimer.

(21) Appl. No.: 16/801,681

(22) Filed: Feb. 26, 2020

(65) Prior Publication Data

US 2021/0264035 A1 Aug. 26, 2021

(51) Int. Cl.
*G06F 21/57* (2013.01)
*G06F 16/245* (2019.01)
(Continued)

(52) U.S. Cl.
CPC .......... *G06F 21/577* (2013.01); *G06F 16/245* (2019.01); *G06F 21/554* (2013.01);
(Continued)

(58) Field of Classification Search
CPC .... G06F 21/577; G06F 16/245; G06F 21/554; G06F 2221/034; G06F 21/57; G06N 5/04; G06N 20/00; G06N 20/20
See application file for complete search history.

(56) References Cited

U.S. PATENT DOCUMENTS

| 2008/0289027 A1 | 11/2008 | Yariv et al. | |
| 2011/0251960 A1* | 10/2011 | Holla | H04L 9/14 705/51 |

(Continued)

FOREIGN PATENT DOCUMENTS

| CN | 112019494 A | * 12/2020 | ......... G03G 15/2003 |
| CN | 114255830 A | * 3/2022 | |

(Continued)

OTHER PUBLICATIONS

Daniel Wood, Cleartext Data Transmissions in Consumer IoT Medical Devices, IoT S&P'17, Nov. 3, 2017, Dallas, TX, USA, pp. 7-12 (Year: 2017).*

(Continued)

*Primary Examiner* — Shahriar Zarrineh
(74) *Attorney, Agent, or Firm* — M&B IP Analysts, LLC

(57) ABSTRACT

A system and method for determining device attributes using a classifier hierarchy. The method includes: determining at least one exploitation condition for a medical device based on at least one first device attribute of the medical device and a plurality of second device attributes indicated in a vulnerabilities database, wherein the vulnerabilities database further indicates a plurality of known exploits for the plurality of second device attributes; analyzing behavior and configuration of the medical device to detect an exploitable vulnerability for the medical device, wherein the exploitable vulnerability is a behavior or configuration of the medical device which meets the at least one exploitation condition; and performing at least one mitigation action based on the exploitable vulnerability.

17 Claims, 4 Drawing Sheets

(51) Int. Cl.
  *G06N 5/04* (2006.01)
  *G06N 20/00* (2019.01)
  *G06F 21/55* (2013.01)

(52) U.S. Cl.
  CPC .............. *G06N 5/04* (2013.01); *G06N 20/00* (2019.01); *G06F 2221/034* (2013.01)

(56) References Cited

U.S. PATENT DOCUMENTS

| | | | |
|---|---|---|---|
| 2013/0247194 A1 | 9/2013 | Jha et al. | |
| 2016/0094578 A1 | 3/2016 | McQuillan et al. | |
| 2017/0090499 A1 | 3/2017 | Dolan | |
| 2018/0332069 A1* | 11/2018 | Moore | H04L 63/1433 |
| 2018/0351987 A1* | 12/2018 | Patel | G06F 21/577 |
| 2019/0020641 A1* | 1/2019 | Wasily | H04L 9/3213 |
| 2019/0095587 A1* | 3/2019 | Warner | G06F 21/57 |
| 2019/0215688 A1* | 7/2019 | Zavesky | H04L 63/1491 |
| 2019/0238584 A1* | 8/2019 | Somasundaram | H04L 63/1433 |
| 2019/0362076 A1* | 11/2019 | Wang | G06Q 30/0207 |
| 2019/0392152 A1* | 12/2019 | Patel | G06F 21/577 |
| 2020/0097651 A1* | 3/2020 | Mestha | G06F 21/554 |
| 2020/0210592 A1 | 7/2020 | Karas et al. | |
| 2020/0210871 A1* | 7/2020 | Alperovich | G06N 20/00 |
| 2020/0222010 A1* | 7/2020 | Howard | A61N 1/36139 |
| 2020/0403991 A1 | 12/2020 | Sohail et al. | |

FOREIGN PATENT DOCUMENTS

| | | | | |
|---|---|---|---|---|
| EP | | 3745291 A1 * | 12/2020 | G03G 15/2003 |
| WO | WO-2018071845 A1 * | | 4/2018 | A61B 5/0022 |
| WO | WO-2020093020 A1 * | | 5/2020 | A61B 5/0022 |
| WO | WO-2020141486 A1 * | | 7/2020 | G06F 21/552 |
| WO | WO-2021105995 A1 * | | 6/2021 | |

OTHER PUBLICATIONS

Emma McMahon, Assessing Medical Device Vulnerabilities on the Internet of Things, 2017, Department of Management Information Systems The University of Arizona, pp. 176-178 (Year: 2017).*

Jake Beavers, Sina Pournouri, Recent Cyber Attacks and Vulnerabilities in Medical Devices and Healthcare Institutions, Apr. 9, 2019, Part of the Advanced Sciences and Technologies for Security Applications book series (ASTSA), https://link.springer.com/chapter/10.1007/978-3-030-11289-9_11 (Year: 2019).*

Aamna Alsuwaidi, Security Vulnerabilities Detected in Medical Devices, 12th Annual Undergraduate Research Conference on Applied Computing (URC2020), United Arab Emirates University, College of IT, Department of Information Systems and Security, 6 pages (Year: 2020).*

Patricia AH Williams and Andrew J Woodward, Cybersecurity vulnerabilities in medical devices: a complex environment and multifaceted problem, 2015, eHealth Research Group and Security Research Institute, Edith Cowan University, Perth, WA, Australia Correspondence: School of Computer and security (Year: 2015).*

International Search Report and Written Opinion of International Searching Authority for PCT/IB2021/050432, ISA/RU, Jerusalem, IL dated Apr. 22, 2021.

International Search Report and Written Opinion of International Searching Authority for PCT/IB2021/050433, ISA/IL, Jerusalem, Israel, dated Apr. 25, 2021.

U.S. Appl. No. 16/801,681, filed Feb. 26, 2020, Shaked Gitelman.

* cited by examiner

TECHNIQUES FOR DETECTING EXPLOITATION OF MEDICAL DEVICE VULNERABILITIES

TECHNICAL FIELD

The present disclosure relates generally to cybersecurity, and more specifically to identifying potential points of exploitation for devices.

BACKGROUND

Whenever a new device connects to a network of an organization or is activated in a location that is proximate to the organization's physical location, there is a possibility that the new device could be used by a malicious entity to cause harm to the organization, the network, or both. The number of potential cyber harms that may occur due to network access has increased exponentially due to the rapidly increasing number of new devices that are now capable of network connectivity. Further, many of these new devices are not only capable of connecting to networks, but may also be able to create their own networks or hotspots.

Some particular devices that may be targets for malicious entities include devices used in medical applications. As examples, pacemakers, insulin pumps, defibrillators, and other medical devices provide critical health functions that, if disrupted or controlled, could result in death or other significant bodily harm to patients, or could result in leaking or altering protected health information of patients.

Many medical devices are Internet-of-Things devices or otherwise connect to other devices via local or network connections. These connections may leave medical devices exposed to cyber threats through such connections. Additionally, medical devices frequently connect to sensors and monitors on a hospital network. Accordingly, these medical devices provide potential entry points into the hospital network. Thus, preventing exploitation of vulnerabilities in these devices is critical.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

The embodiments disclosed herein include a method for determining device attributes using a classifier hierarchy. The method comprises: determining at least one exploitation condition for a medical device based on at least one first device attribute of the medical device and a plurality of second device attributes indicated in a vulnerabilities database, wherein the vulnerabilities database further indicates a plurality of known exploits for the plurality of second device attributes; analyzing behavior and configuration of the medical device to detect an exploitable vulnerability for the medical device, wherein the exploitable vulnerability is a behavior or configuration of the medical device which meets the at least one exploitation condition; and performing at least one mitigation action based on the exploitable vulnerability.

The embodiments disclosed herein also include a non-transitory computer readable medium having stored thereon instructions for causing a processing circuitry to execute a process, the process comprising: determining at least one exploitation condition for a medical device based on at least one first device attribute of the medical device and a plurality of second device attributes indicated in a vulnerabilities database, wherein the vulnerabilities database further indicates a plurality of known exploits for the plurality of second device attributes; analyzing behavior and configuration of the medical device to detect an exploitable vulnerability for the medical device, wherein the exploitable vulnerability is a behavior or configuration of the medical device which meets the at least one exploitation condition; and performing at least one mitigation action based on the exploitable vulnerability.

The embodiments disclosed herein also include a system for determining device attributes using a classifier hierarchy. The system comprises: a processing circuitry; and a memory, the memory containing instructions that, when executed by the processing circuitry, configure the system to: determine at least one exploitation condition for a medical device based on at least one first device attribute of the medical device and a plurality of second device attributes indicated in a vulnerabilities database, wherein the vulnerabilities database further indicates a plurality of known exploits for the plurality of second device attributes; analyze behavior and configuration of the medical device to detect an exploitable vulnerability for the medical device, wherein the exploitable vulnerability is a behavior or configuration of the medical device which meets the at least one exploitation condition; and perform at least one mitigation action based on the exploitable vulnerability.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
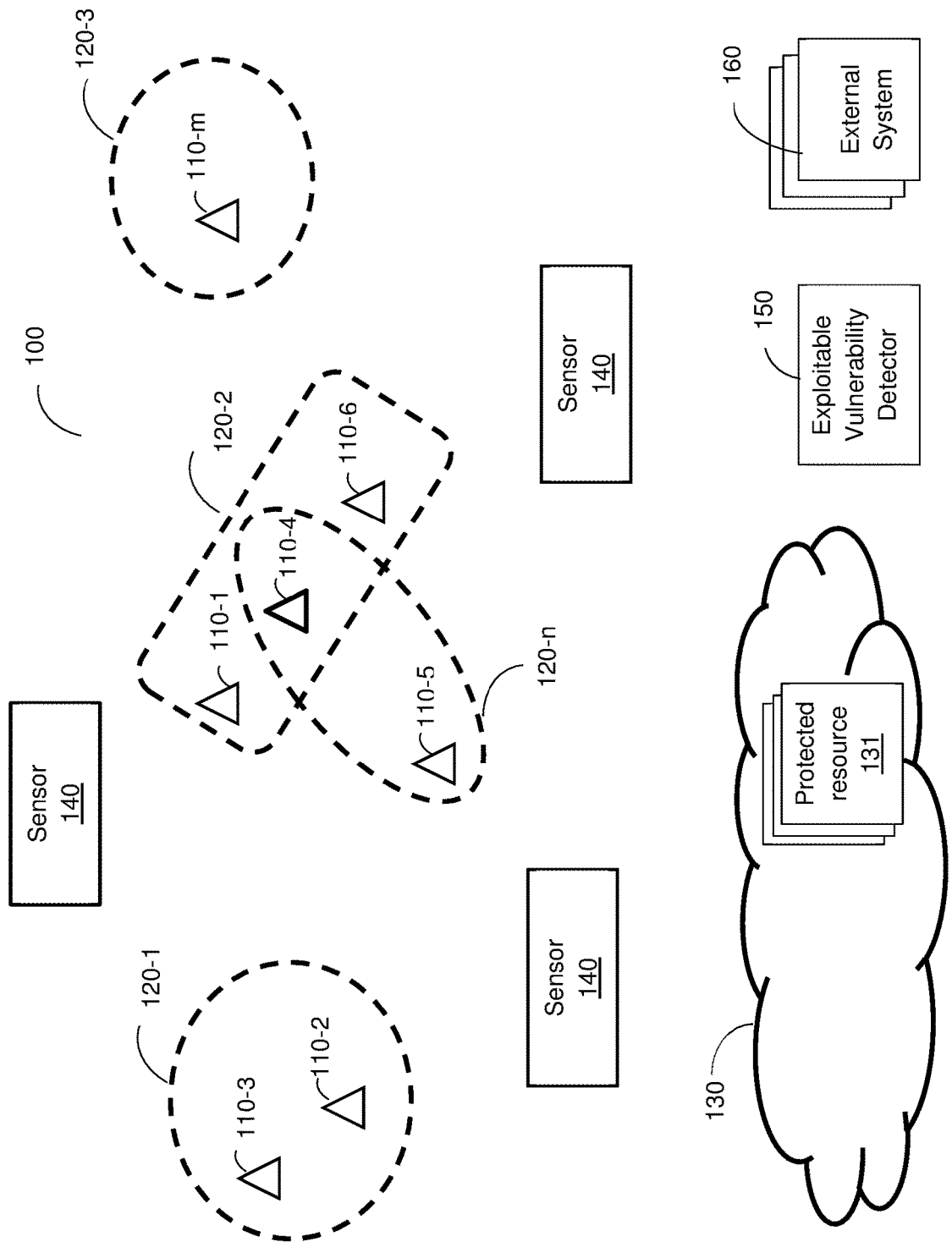
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that medical devices are often exploited when configured in a particular manner or when communicating via points of connection such as ports, networks, switches, or routers. More specifically, it has been identified that various medical devices communicate using unencrypted protocols, which presents vulnerabilities that can be exploited when accessing the Internet. As non-limiting examples, common unencrypted protocols used by medical devices include DICOM, HL7, and POCT. Accordingly, it has been identified that exploitable vulnerabilities may be detected and mitigated based on configuration, behavior, and communications by the medical device.

It has been further identified that some vulnerabilities are not exploitable, i.e., do not present a threat of hacking. For example, the device being blocked from accessing the Internet is a vulnerability but cannot be exploited to control the device or otherwise allow malicious entities to access the device or any networks connected thereto. For purposes of cybersecurity, it is desirable to distinguish between exploitable vulnerabilities and non-exploitable vulnerabilities since prioritization of resources may be critical to effective mitigation of exploitation.

In an embodiment, a device profile is created for a medical device. Based on the device profile and a vulnerability database, one or more known exploits of the medical device are determined. The vulnerability database definitions of common exploits for vulnerabilities of specific types of medical devices. Device activity, device configuration, or both, is checked in order to detect exploitable vulnerabilities based on the known exploits. Mitigation actions may be performed to avoid exploitation of the detected exploitable vulnerabilities.

FIG. 1 is an example network diagram utilized to describe various disclosed embodiments. In FIG. 1, an environment 100 includes a plurality of devices 110-1 through 110-*m* (hereinafter referred to individually as a device 110 and collectively as devices 110, merely for simplicity purposes) and a plurality of coexisting networks 120-1 through 120-*n* (hereinafter referred to individually as a network 120 and collectively as networks 120, merely for simplicity purposes), thereby allowing communication between and among the devices 110. Also, operable in the environment 100 is an internal network 130 of an organization. The internal network 130 includes protected resources 131. Such protected resources 131 may include, but are not limited to, servers, computers, databases, services, applications, data, and the like.

Each device 110 may be, but is not limited to, a laptop, a PC, a smartphone, an IoT device, a wearable device, a peripheral device (e.g., a printer, a mouse, a keyboard, a speaker, etc.), an appliance, a remote controller, a wireless router (access point), or any other electrical or electronic device that can communicate over a network. In an embodiment, one or more of the devices 110 is a medical device such as, but not limited to, a pacemaker, a heart monitor, an insulin pump, a defibrillator, and the like.

The network 120 can facilitate communication using communication protocols such as, but not limited to, Digital Imaging and Communications in Medicine (DICOM), Health Level 7 (HL7), Point of Care Testing 1 (POCT1), Wi-Fi, nRF, cellular communication protocols (e.g., LTE, 2G, 3G, 4G, etc.), Zigbee, Z-Wave, EnOcean, DECT, 6LoWPAN, and the like. It should be noted that application layer protocols can communicate over such communication protocols. Examples for application layer protocols include, but are not limited to, AirDrop®, HTTP, SMB, NTLM, HTTP/HTTPS, OBEX, and the like. Alternatively or collectively, the devices 110 may communicate directly with each other or with other systems directly using communication protocols such as, but not limited to, Bluetooth®, Bluetooth low energy (BLE), and the like.

In an example implementation, a plurality of sensors 140-1 through 140-*p* (hereinafter referred to individually as a sensor 140 and collectively as sensors 140, merely for simplicity purposes) are deployed in the network 100. Each sensor 140 is deployed as an out-of-band device and is configured to monitor and control the wireless traffic transmitted by the devices 110 in proximity of where the sensor 140 is deployed. In some embodiments, a sensor 140 can be deployed as a device connected in the network 100, as a passive device that merely listens to the traffic, or as a tap device.

In an example implementation, each sensor 140 may be configured to process the monitored traffic based on a corresponding wireless communication protocol. For example, if the monitored traffic is transmitted over a Bluetooth® connection, the sensor 140 is configured to extract data as carried by the Bluetooth® protocol through its entire stack. Such data may include headers and payload data required to determine, for example, if a new connection is established, if an existing connection is identified, a type of data being transmitted, or a combination thereof. Thus, each sensor 140 is configured to process stack (all or some of the layers) of each wireless protocol supported by the sensor 140. Examples for such wireless protocols are mentioned above. In an embodiment, each sensor 140 can handle at least one type of wireless protocol.

In an example implementation, a sensor 140 can sniff traffic transmitted between two devices 110 over a secured Wi-Fi network (e.g., the network 120-1). To extract the protocol-data, the sensor 140 is required to decrypt the data being transmitted over the air. To this end, according to an embodiment, the passphrase of the Wi-Fi network is uploaded to and stored in the sensor 140. Using the passphrase, the sensor 140 can act as a passive device configured to listen to data traffic over the Wi-Fi network and decrypt any data traffic transported between the devices (e.g., the devices 110-3 and 110-2 in the network 120-1).

In another example implementation, a sensor 140 is also configured to capture BLE communications between two paired medical devices 110 and to extract protocol-data. To discover the encryption key, the passkey entry (e.g., 6 digits when a passkey entry pairing procedure is utilized) is guessed or preconfigured either by the sensor 140 or the system 150. For example, the passkey entry can be guessed by trying all possible options of a 6-digit code. Using the discovered passkey entry and captured handshake, the encryption key can be derived for the session based on the BLE key exchange procedure. Using that encryption key, the communication between two devices 110 can be decrypted and the protocol-data is extracted.

In yet another example implementation, the sensor 140 can extract traffic parameters by querying network devices (not shown) installed or deployed in the environment 100. For example, the sensor 140 can query a wireless access point about new connections being established and the devices that participated in such establishments of connections. For example, a network device can be queried on the type of connection being established, the protocol type, the devices participated in the connection, when the connection was established, and so on. In yet another embodiment, the sensor 140 can query the devices 110 to retrieve information about a particular device 110. For example, the vendor and current OS type of the device 110-2 can be retrieved by querying the device 110-2.

The data extracted by each sensor 140 may be sent to the exploitable vulnerability detector 150 for further analysis. As a non-limiting example, when the sensor 140 identifies a new wireless connection, data associated with the new wireless connection is sent to the exploitable vulnerability detector 150.

The information utilized to determine device attributes is processed by the sensor 140, the exploitable vulnerability detector 150, or both. In an embodiment, for example, the sensors 140 can identify MAC addresses in traffic transported over the air. The MAC addresses are sent to the exploitable vulnerability detector 150, which correlates the addresses to identify a single device that is associated with two or more MAC addresses. A MAC address can also provide an indication of a vendor for a given device. Determination of a device's vendor based on the MAC address may be performed by the sensors 140 or by the exploitable vulnerability detector 150.

It should be noted that the information provided by the sensors 140 to the hierarchical classification 150 may be decrypted and may contain relevant information for analysis by the exploitable vulnerability detector 150. For example, such information may include behavioral or configuration data such as, but not limited to, network addresses (e.g., IP addresses, URLs, port numbers, etc.) accessed by a device 110, network activities engaged in by the device 110, network configuration settings of the device 110, and the like. The information may include data being accessed or transferred by a device 110. For example, the contents of a Word document transferred from a device 110 to a location in or outside the environment 100 would be provided to the exploitable vulnerability detector 150.

In an embodiment, the sensors 140 are also configured to perform mitigation actions under the control of the exploitable vulnerability detector 150. For example, the sensor 140 can terminate a wireless connection with a device 110 determined to be vulnerable. In another embodiment, the exploitable vulnerability detector 150 may be configured to perform the mitigation actions or to cause the sensors 140 to perform the mitigation actions.

Each sensor 140 may be realized as a physical appliance, a virtual appliance (executed by a processing system), or a combination thereof. Examples for virtual appliance implementations include, but are not limited to, a virtual machine, a micro-service, a software agent, and the like.

The exploitable vulnerability detector 150 may be deployed in a datacenter, a cloud computing platform (e.g., a public cloud, a private cloud, or a hybrid cloud), on-premises of an organization, or in a combination thereof. The exploitable vulnerability detector 150 or functions thereof may be embedded in one or more of the sensors 140.

In an example deployment, the exploitable vulnerability detector 150 is configured to interface with one or more external systems 160. Examples for such external systems 160 may include, but are not limited to, an active directory of the organization utilized to retrieve user permissions, access control systems, security information and event management (SIEM) systems utilized to report on detected vulnerabilities, vulnerability scanners, or other devices that can feed the exploitable vulnerability detector 150 with potential threats or known vulnerabilities.

More specifically, such external systems 160 may provide vulnerabilities databases identifying known vulnerabilities that are device type-specific and defining known exploits for those vulnerabilities. Alternatively or collectively, such vulnerabilities databases may be stored in the exploitable vulnerability detector 150. The external systems 160 may further include an inventory management system, an identity management system, an authentication server, and the like.

In an embodiment, the exploitable vulnerability detector 150 is configured to detect exploitable vulnerabilities for the devices 110 as described herein. Specifically, based on device attributes of the devices 110 and a vulnerabilities database defining known exploits for vulnerabilities of various device types, the exploitable vulnerability detector 150 is configured to identify one or more known exploits for each device 110. The exploitable vulnerability detector 150 is further configured to analyze the behavior, configuration, or both, of each device 110, and to detect exploitable vulnerabilities based on the analysis and the known exploits.

As a non-limiting example for detecting exploitable vulnerabilities, a device profile indicates that a device 110-1 runs an operating system "RT OS" used by devices requiring real-time operating systems. A vulnerabilities database stored in one of the external systems 160 is checked by the exploitable vulnerability detector 150 for known vulnerabilities associated with devices running the "RT OS" operating system. The vulnerabilities database indicates a known vulnerability that is exploited when connections are enabled by a device running the "RT OS" operating system. A configuration of the device 110-1 is analyzed by the exploitable vulnerability detector 150 to determine that the device 110-1 has a currently exploitable vulnerability based on TCP connections being enabled for the device 110-1.

As another non-limiting example for detecting exploitable vulnerabilities, a device profile indicates that a device 110-2 uses a Bluetooth Low Energy (BTE) chip. A vulnerabilities database stored in one of the external systems 160 is checked by the exploitable vulnerability detector 150 for known vulnerabilities associated with devices having BTE chips installed. The vulnerabilities database indicates a known vulnerability that is exploited when a device communicates with an access point using artificial intelligence (AI) to optimize end user experience. Behavior of the device 110-2 is analyzed by the exploitable vulnerability detector 150 to determine that the device 110-2 has a currently exploitable vulnerability based on its connection to such an AI-based access point.

In a further embodiment, the exploitable vulnerability detector 150 is configured to determine device attributes. In yet a further embodiment, the exploitable vulnerability detector 150 is configured to navigate a classifier hierarchy in order to determine each device attribute, for example, a device attribute of one of the devices 110. The exploitable vulnerability detector 150 may be further configured to train sub-models of the hierarchy.

The exploitable vulnerability detector 150 may be further configured to detect devices 110 that do not belong to the organization which may perform malicious activity, and thus may pose a risk to devices and networks in the environment 100. Without limiting the scope of the disclosed embodiments, such devices will be referred to as vulnerable devices. Such detection may be performed in part based on data extracted by and received from the sensors 140. The exploitable vulnerability detector 150 may be configured to profile each device 110 discovered in the environment 100 using device attributes determined as described herein. The profiling of devices is performed in part to determine if a device is a legitimate device. In some implementations, the exploitable vulnerability detector 150 is configured to create a list of legitimate devices and a list of "unknown devices". A legitimate device is a device 110 that is authorized to access the internal network 130 or any protected resource 131. An unknown device is a device 110 that cannot be identified as a legitimate device.

In order to discover new devices 110, the sensors 140 may be configured to detect any new wireless connections being established in the environment 100. For example, any new connection established with an access point (e.g., over a Wi-Fi network) or with another device (e.g., a Bluetooth® connection) is detected. Alternatively or collectively, devices 110 can be detected when devices are disconnected from the network. For example, if the device 110 detects a probe request from a Wi-Fi network or a page request in a Bluetooth network, such requests are indicative of a disconnected device. The device 110 that initiated such requests is a discovered device.

At least a unique identifier of a device that initiated the connection is extracted or determined by the sensor 140. Based on the value of the extracted unique identifier, it is determined if the device was already discovered. The unique identifier may include, but is not limited to, a MAC address. A list of previously discovered devices can be managed in a centralized location (e.g., in the exploitable vulnerability detector 150) or distributed among the various sensors 140.

It should be noted that the unique identifier is not always available upon discovering a new device 110. For example, Bluetooth piconets, slave devices, and the like are identified without having knowledge of their MAC addresses. In such cases, the unique identifier may be a temporary slot address assigned by a master device to the slave device using the temporary slot address. The MAC address of the slave device can be extracted at a later time.

In an embodiment, the exploitable vulnerability detector 150 may be configured to determine whether a wireless device 120 is vulnerable based on the profile for the device and data indicating activity of the wireless device 120. Specifically, a wireless device 120 may be determined to be vulnerable if, for example, the activity of the wireless device 120 is abnormal given the device attributes in the profile of the wireless device 120. Such abnormalities may be defined by predetermined rules for different device attributes, using a machine learning model trained using activity data from devices having different device attributes, or a combination thereof.

It should be appreciated that the embodiments disclosed herein are not limited to the specific architecture illustrated in FIG. 1 and that other architectures may be used without departing from the scope of the disclosed embodiments. Specifically, in an embodiment, there may be a plurality of exploitable vulnerability detectors 150 operating as described hereinabove and configured to either have one as a standby, to share loads between them, or to split the functions between them.

Further, in a typical environment 100 or a typical deployment, there will be a plurality of internal networks which can co-exist, i.e., a single network 130 is shown in FIG. 1 merely for the purpose of simplicity of discussion. Communications according to the disclosed embodiments may be conducted via networks such as, but not limited to, a wireless, cellular or wired network, a local area network (LAN), a wide area network (WAN), a metro area network (MAN), the Internet, the worldwide web (WWW), similar networks, and any combination thereof. Additionally, the devices for which exploitable vulnerabilities are detected may equally be wired devices that connect to the networks via wired connections without departing from the scope of the disclosure.

It should be further noted that, in some configurations, one or more sensors 140 can be embedded in the exploitable vulnerability detector 150. It should also be noted that the vulnerability detector 150 is depicted as being deployed in the environment 100, but that the vulnerability detector 150 may equally be deployed outside the environment 100 without departing from the scope of the disclosure. As a non-limiting example, the vulnerability detector 150 may be deployed in a cloud computing environment and receive data from the sensors 140 remotely.

Figure 2:
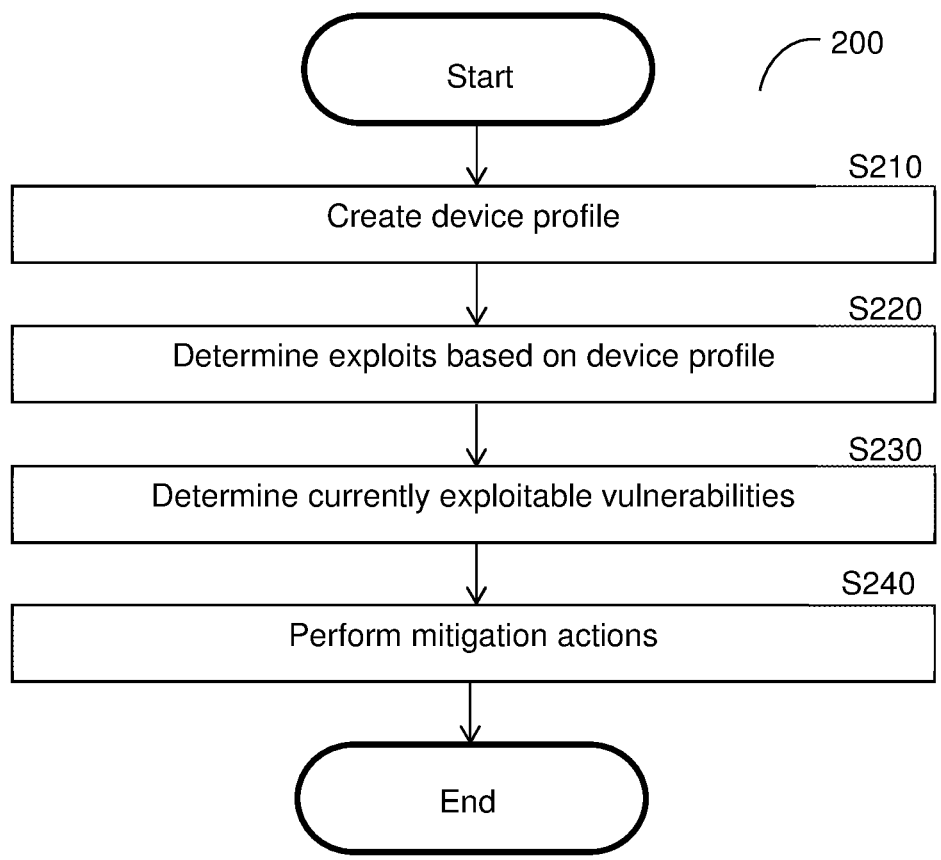
FIG. 2 is a flowchart illustrating a method for detecting exploitation of device vulnerabilities according to an embodiment.

FIG. 2 is an example flowchart 200 illustrating a method for detecting exploitation of medical device vulnerabilities according to an embodiment. In an embodiment, the method is performed by the exploitable vulnerability detector 150, FIG. 1.

At S210, a device profile is created for a medical device. In an embodiment, the device profile may be created by using a classifier hierarchy to determine each of one or more device attributes as described further below with respect to FIG. 3. In a further embodiment, the determined device attributes are used to create the device profile for the medical device.

The device profile defines device attributes of the medical device. Such device attributes may include, but are not limited to, a type of device, communication protocols used by the device, hardware components of the device, software installed on the device, operating system used by the device, combinations thereof, and the like. The type of device may be indicated with respect to broader categories of devices (e.g., diagnostic equipment, treatment equipment, life support equipment, medical monitors, laboratory equipment, therapeutic equipment, etc.), specific types of devices (e.g., pacemaker, heart monitor, insulin pump, defibrillator, infusion pump, electroencephalogram (EEG) system, epilepsy monitoring unit, ultrasound machine, magnetic resonance imaging (MRI) machine, X-ray machine, computer tomography [CT] scanner, medical lasers, incubators, heart-lung machines, dialysis machines, blood pressure monitors, etc.), or both.

At S220, the created device profile is compared to a vulnerabilities database to determine one or more known exploits used to exploit vulnerabilities in the medical device. The vulnerabilities database includes device attributes associated with exploitable vulnerabilities and corresponding known exploits.

As noted above, different types of devices are typically exploited in different ways. Accordingly, identifying potential exploits based on device attributes defined in the device profile allows for more accurately detecting exploitable vulnerabilities. Additionally, the improved device attributes determined in accordance with some embodiments (e.g., the embodiments described above with respect to FIG. 3) provide more accurate device attributes which, in turn, provides for more accurate identification of exploitable vulnerabilities.

The known exploits may be defined with respect to exploitation conditions including points of connection, behaviors, configuration parameters, or a combination thereof. Example points of connection whose use may indicate exploitable vulnerabilities include, but are not limited to, specific ports, networks, switches, routers, and other access points. Example behaviors may include, but are not limited to, number of ports used, accessing the Internet (or lack thereof), and the like. Example configuration parameters may include, but are not limited to, transmission control protocol (TCP) connections being enabled, running a particular application, and the like.

As noted above, it has been identified that medical devices often communicate using proprietary communications protocols that are unencrypted such that Internet access by these devices is frequently used to exploit them. Accordingly, known exploits for devices using such unencrypted protocols may include connections to the Internet.

In some implementations, the vulnerabilities database may be organization-specific, i.e., specific to devices operating with an environment of a particular organization. To this end, the vulnerabilities database may be created using machine learning based on device activity of devices acting within a particular environment. More specifically, the known vulnerabilities may include deviations from device profiles of devices within the environment indicated in historical data used to train a machine learning model. For example, vulnerabilities may be related to organization-specific behaviors and configurations such as, but not limited to, use of particular applications, connection to particular points of connection, and the like.

At S230, the device behavior and configuration are analyzed with respect to the known exploits in order to detect one or more currently exploitable vulnerabilities. Each currently exploitable vulnerability is a behavior, configuration, or combination thereof (e.g., a particular combination of coexisting behaviors and configurations) that meets the exploitation conditions.

In an embodiment, S230 may further include interacting with one or more vulnerability scanners to obtain additional information related to device behavior or configuration. As a non-limiting example, when the analysis results in identifying that one or more ports is open, S230 may include querying a vulnerability scanner for identifying information for the open ports. Such more specific information may help identify whether a port used by known exploits is open and, therefore, whether the device has a currently exploitable vulnerability.

At S240, one or more mitigation actions are performed. The mitigation actions may include, but are not limited to, denying activities of the device, changing the device's configuration, disconnecting one or more connections to the device, or a combination thereof. In an embodiment, the mitigation actions are determined based on the detected currently exploitable vulnerabilities.

As a non-limiting example for detecting medical device vulnerabilities, a device profile for a medical imaging device (e.g., an MRI machine, a CT scanner, an X-ray machine, an ultrasound machine, etc.) indicates that the medical imaging device communicates using DICOM, an unencrypted protocol which can be altered and is used to communicate personal health information. The device profile is compared to a vulnerabilities database in order to determine that known exploits for a device communicating using the DICOM protocol include connection to the Internet. Network connections of the medical imaging device are checked to identify that the medical imaging device using the DICOM protocol is connected to the Internet and, therefore, has a currently exploitable vulnerability. The Internet connection may be severed, thereby mitigating the vulnerability.

Figure 3:
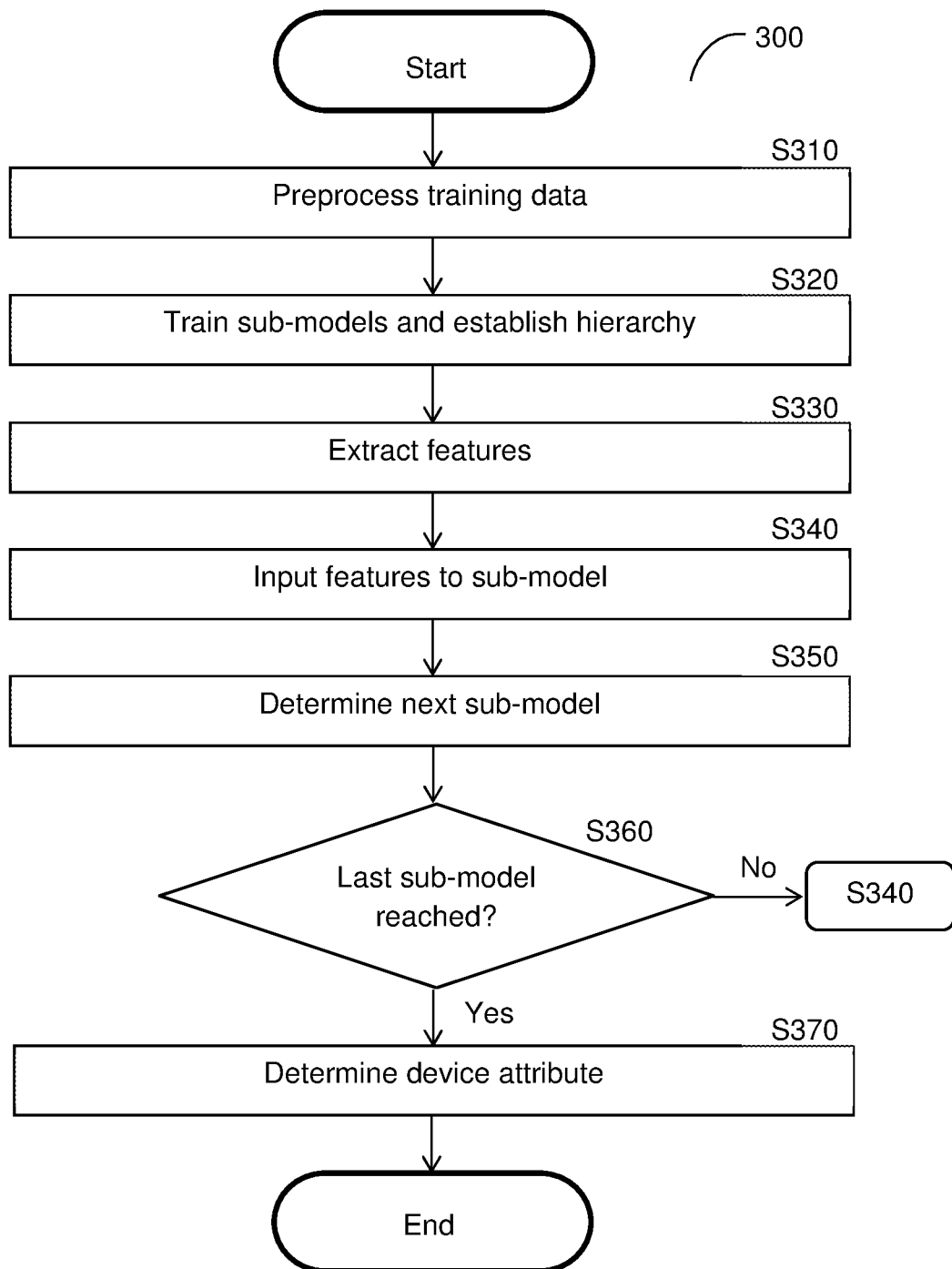
FIG. 3 is a flowchart illustrating a method for determining a device attribute using a classifier hierarchy according to an embodiment.

FIG. 3 is an example flowchart 300 illustrating a method for determining a device attribute using a classifier hierarchy according to an embodiment.

At S310, training data to be used for training classifiers of a hierarchy is preprocessed. The training data includes data related to multiple devices such as, but not limited to, data obtained from a device, data related to activity of a device (e.g., network activity), or a combination thereof. The network activity data may include, but is not limited to, amounts of traffic sent and received, domains used, ports used, number of sessions, number of hosts that are talked to, and the like, over a period of time. In an embodiment, the training data further includes class labels indicating device attributes of each device.

In an embodiment, S310 includes extracting features from the training data. The features to be extracted are based on the classifiers to be applied.

In a further embodiment, S310 may further include cleaning the training data. The classifiers to be used may include a predetermined set of classifiers, with each classifier being associated with a different device attribute. The classifiers include some classifiers that do not overlap in device attributes (e.g., a classifier associated with mobile devices and a classifier associated with non-mobile devices) and some classifiers that overlap in device attributes such that one classifier is associated with a more specific device attribute than the other (e.g., a classifier associated with mobile devices and a classifier associated with smartphones, i.e., a specific type of mobile device).

In an embodiment, S310 further includes reducing the training data with respect to devices. To this end, data related to at least some of the devices may be excluded. In yet a further embodiment, data related to devices for which the required device attributes are unknown (i.e., unlabeled), data related to devices for which identified device attributes are not consistent (i.e., inconsistent labels), or both, may be excluded.

In another embodiment, S310 may further include removing one or more of the training device attribute classes indicated by the training labels. To this end, S310 may include excluding classes, modifying classes, or both. To this end, classifiers associated with the excluded or modifying classes may be excluded or modified. Excluded classes may include, but are not limited to, classes which have a small (e.g., below a threshold) number of examples in the training data, i.e., classes for which a small number of devices have the class as a device attribute. Modifying classes may include merging multiple classes, for example, classes which have a low degree of behavioral trait variance (e.g., classes for which similarity of features used to determine the class is above a threshold), into a single class.

At S320, the sub-models of the hierarchy are trained and the hierarchy is established. In an embodiment, the sub-models are trained using gradient boosted trees.

In an embodiment, the hierarchy includes multiple levels with at least some levels including multiple sub-models. Sub-models of different levels provide different granularities with respect to device attributes. As a non-limiting example, a lower granularity sub-model may be trained to determine a device type (e.g., "printer"), and a higher granularity sub-model may more specifically be trained to determine a model of the device (e.g., "ABC Company Model 8 Printer").

In an embodiment, the hierarchy uses ensemble learning techniques. Specifically, different classifiers of sub-models of the hierarchy may be applied to features extracted from a data set, and a class representing a device attribute is selected based on the outputs of the classifiers of each sub-model. To this end, each classifier may be trained to output a confidence score for its respective class. The confidence score indicates a likelihood that the class of the classifier represents the correct device attribute and may be compared to other confidence scores to determine which label should be selected.

In an embodiment, the training of each classifier is a supervised machine learning process using training data including training device data and labels indicating device attribute classifications. The training device data may include, but is not limited to, data obtained by inspecting device, data obtained by monitoring traffic into and out of the device, network data related to the device, and the like. Such training device data may include types of data that are captured by systems monitoring the device (e.g., the sensors 140 monitoring the devices 110, FIG. 1.

At S330, features are extracted from the application data. The extracted features include features required by each classifier to be used as part of the hierarchical ensemble classification. In some embodiments, features may be extracted as needed while navigating the hierarchy. For example, because navigating the hierarchy includes selecting sub-models (i.e., groups of one or more classifiers) in the next level of the hierarchy to be used, features may be extracted only when needed by classifiers of the next selected sub-model. This allows for minimizing the amount of feature extraction. Alternatively, all potentially necessary features may be extracted prior to navigating the hierarchy.

At S340, a sub-model is applied to the features extracted from the application data in order to determine an appropriate class. In an embodiment, first sub-model applied is the sub-model including nodes directly below a root node.

In an embodiment, S340 each classifier of the sub-model is applied to the relevant features and an appropriate class is determined based on the output of each classifier. In an example implementation, each classifier outputs a confidence score, and the class of the classifier which outputs a confidence score above a threshold is determined as the appropriate class. Alternatively, the class of the classifier which outputs the highest confidence score may be determined as the appropriate class. In some implementations, if all classifiers output a confidence score below a threshold, no device attribute or a null value may be determined.

At S350, based on the output of the classifiers applied at S340, the next relevant sub-model of the hierarchy is determined. In an embodiment, the next relevant sub-model is the sub-model in the next level of the hierarchy that is associated with the class determined using the previous sub-model.

At S360, it is determined if a last sub-model for the current traversal of the hierarchy has been reached. If so, execution continues with S370; otherwise, execution continues with S340 where features are input to a relevant sub-model in the next level of the hierarchy. In an embodiment, the last level of the hierarchy in which the last sub-model is located may be different depending on the path taken while traversing the hierarchy.

In an embodiment, the last sub-model of the hierarchy for a particular path has been reached when a termination criterion has occurred. In an embodiment, the termination criterion has occurred when no more sub-models being along the path (e.g., when each classifier of the sub-model is represented by a leaf node). Note that the last sub-model according to the disclosed embodiments does not need to be a sub-model in the lowest or highest level of the hierarchy, and that traversal may cease before such a level is reached.

In an embodiment, the termination criterion may be that a sub-model outputs a low confidence classification having a confidence score below a threshold. In such an embodiment, the most recently applied sub-model prior to the sub-model that output the low confidence classification is identified as the last sub-model such that the classification of such most recently applied sub-model is used for determining the device attribute. Thus, any more specific classification that fails to meet the confidence score threshold may be excluded from use, thereby further improving accuracy of the device attribute determination.

At S370, a device attribute is determined. In an embodiment, the device attribute is determined based on the appropriate class determined for the most recently applied sub-model. The device attribute may be used, for example, as part of a device profile, which in turn may be used to identify abnormal activity of devices which may require mitigation. Thus, the device attribute identification described herein may be utilized to accurately profile the device, which in turn allows for more accurately identifying abnormalities in device behavior by comparison to devices having the same device attributes or combinations of device attributes. An example for such a use is demonstrated in FIG. 4.

As an example, when the output of a first classifier is a confidence score of 9 for the class "mobile device" and the output of a second classifier is a confidence score of 5 for the class "non-mobile device" when applying the sub-model 325, the class "mobile device" is selected as appropriate such that the next relevant sub-model is determined to be the sub-model 335-1 (i.e., the sub-model in the next level that is below the sub-model 325). The same process is performed by classifiers of subsequent sub-models and, based on the output of those classifiers, a sub-model (e.g., representing the class "smartphones") is determined as the next relevant sub-model. It is determined that the class of the next classifier (e.g., representing the class "ABC Brand smartphone") is the appropriate class.

Applying a classifier hierarchy to determine device attributes is described further in U.S. patent application Ser. No. 16/729,823 filed on Dec. 30, 2019, assigned to the common assignee, the contents of which are hereby incorporated by reference.

Figure 4:
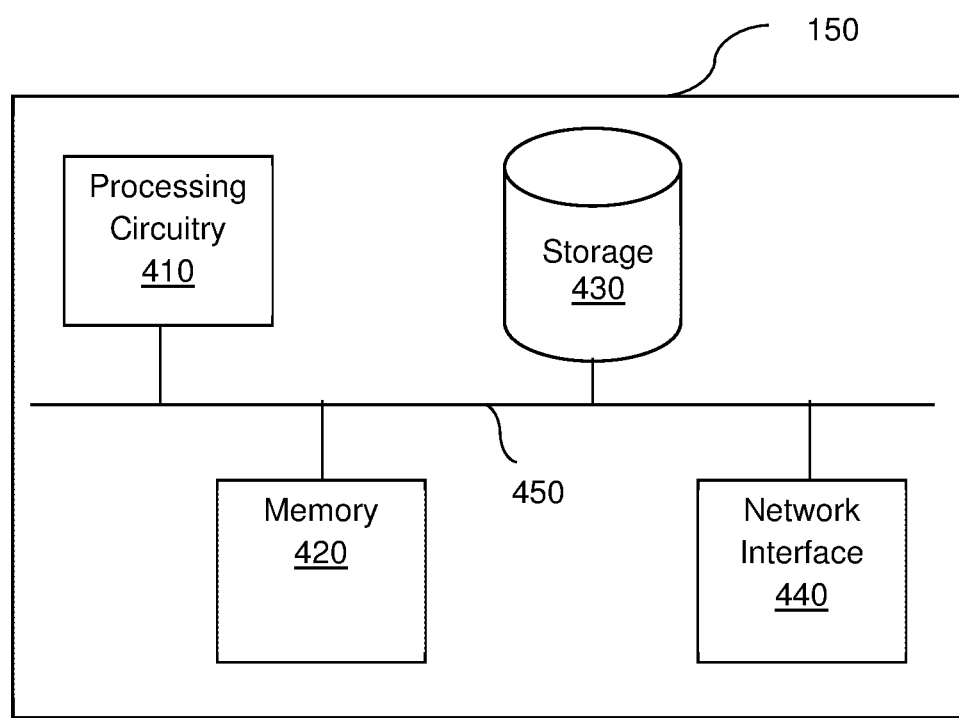
FIG. 4 is a schematic diagram of an exploitable vulnerability detector according to an embodiment.

FIG. 4 is an example schematic diagram of an exploitable vulnerability detector 150 according to an embodiment. The exploitable vulnerability detector 150 includes a processing circuitry 410 coupled to a memory 420, a storage 430, and a network interface 440. In an embodiment, the components of the exploitable vulnerability detector 150 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., RAM, etc.), non-volatile (e.g., ROM, flash memory, etc.), or a combination thereof.

In one configuration, software for implementing one or more embodiments disclosed herein may be stored in the storage 530. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, CD-ROM, Digital Versatile Disks (DVDs), or any other medium which can be used to store the desired information.

The network interface 440 allows the exploitable vulnerability detector 150 to communicate with, for example, the devices 110 or the sensors 140 for the purpose of, for example, receiving data related to device attributes, and the like.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting medical device exploitable vulnerabilities, comprising:
   sequentially applying a plurality of sub-models of a hierarchy to a plurality of features extracted from device activity data, wherein the sequential application ends with applying a last sub-model of the plurality of sub-models, wherein each sub-model includes a plurality of classifiers, wherein each sub-model outputs a class when applied to at least a portion of the plurality of features, wherein each class is a classifier output representing a device attribute, wherein applying the plurality of sub-models further comprises iteratively determining a next sub-model to apply based on the class output by a most recently applied sub-model and the hierarchy;
   determining one of at least one first device attribute of a medical device based on the class output by the last sub-model;
   determining at least one exploitation condition for a medical device based on the at least one first device attribute of the medical device and a plurality of second device attributes indicated in a vulnerabilities database, wherein the vulnerabilities database further indicates a plurality of known exploits for the plurality of second device attributes;
   analyzing behavior and configuration of the medical device to detect an exploitable vulnerability for the medical device, wherein the exploitable vulnerability is a behavior or configuration of the medical device which meets the at least one exploitation condition; and
   performing at least one mitigation action based on the exploitable vulnerability.

2. The method of claim 1, wherein the at least one first device attribute includes use of an unencrypted communications protocol, wherein the behavior of the medical device includes a connection to the Internet, wherein the plurality of known exploits includes connecting to the Internet while using the unencrypted communications protocol.

3. The method of claim 2, wherein the at least one mitigation action includes disconnecting the medical device from the Internet.

4. The method of claim 1, wherein the medical device is any of a medical imaging device, a diagnostic device, life support equipment, a pump, a defibrillator, and a pacemaker.

5. The method of claim 1, wherein the at least one exploitation condition includes at least one of: a point of connection, a behavior, and a configuration parameter.

6. The method of claim 5, wherein the at least one exploitation condition includes a point of connection, wherein the point of connection is any of: a port, a router, a network, and a switch.

7. The method of claim 1, further comprising:
   querying a vulnerability scanner based on the analyzed behavior and configuration of the medical device, wherein the currently exploitable vulnerability is detected based further on a response of the vulnerability scanner to the query.

8. The method of claim 1, wherein each classifier is trained to output a class and a confidence score, wherein the class output by each sub-model is determined based on the class and the confidence score output by each classifier of the sub-model.

9. A non-transitory computer readable medium having stored thereon instructions for causing a processing circuitry to execute a process, the process comprising:
sequentially applying a plurality of sub-models of a hierarchy to a plurality of features extracted from device activity data, wherein the sequential application ends with applying a last sub-model of the plurality of sub-models, wherein each sub-model includes a plurality of classifiers, wherein each sub-model outputs a class when applied to at least a portion of the plurality of features, wherein each class is a classifier output representing a device attribute, wherein applying the plurality of sub-models further comprises iteratively determining a next sub-model to apply based on the class output by a most recently applied sub-model and the hierarchy;
determining one of at least one first device attribute of a medical device based on the class output by the last sub-model;
determining at least one exploitation condition for a medical device based on the at least one first device attribute of the medical device and a plurality of second device attributes indicated in a vulnerabilities database, wherein the vulnerabilities database further indicates a plurality of known exploits for the plurality of second device attributes;
analyzing behavior and configuration of the medical device to detect an exploitable vulnerability for the medical device, wherein the exploitable vulnerability is a behavior or configuration of the medical device which meets the at least one exploitation condition; and
performing at least one mitigation action based on the exploitable vulnerability.

10. A system for determining device attributes using a classifier hierarchy, comprising:
a processing circuitry; and
a memory, the memory containing instructions that, when executed by the processing circuitry, configure the system to:
sequentially apply a plurality of sub-models of a hierarchy to a plurality of features extracted from device activity data, wherein the sequential application ends with applying a last sub-model of the plurality of sub-models, wherein each sub-model includes a plurality of classifiers, wherein each sub-model outputs a class when applied to at least a portion of the plurality of features, wherein each class is a classifier output representing a device attribute, wherein applying the plurality of sub-models further comprises iteratively determining a next sub-model to apply based on the class output by a most recently applied sub-model and the hierarchy;
determine one of at least one first device attribute of a medical device based on the class output by the last sub-model;
determine at least one exploitation condition for a medical device based on the at least one first device attribute of the medical device and a plurality of second device attributes indicated in a vulnerabilities database, wherein the vulnerabilities database further indicates a plurality of known exploits for the plurality of second device attributes;
analyze behavior and configuration of the medical device to detect an exploitable vulnerability for the medical device, wherein the exploitable vulnerability is a behavior or configuration of the medical device which meets the at least one exploitation condition; and
perform at least one mitigation action based on the exploitable vulnerability.

11. The system of claim 10, wherein the at least one first device attribute includes use of an unencrypted communications protocol, wherein the behavior of the medical device includes a connection to the Internet, wherein the plurality of known exploits includes connecting to the Internet while using the unencrypted communications protocol.

12. The system of claim 11, wherein the at least one mitigation action includes disconnecting the medical device from the Internet.

13. The method of claim 10, wherein the medical device is any of a medical imaging device, a diagnostic device, life support equipment, a pump, a defibrillator, and a pacemaker.

14. The system of claim 10, wherein the at least one exploitation condition includes at least one of: a point of connection, a behavior, and a configuration parameter.

15. The system of claim 14, wherein the at least one exploitation condition includes a point of connection, wherein the point of connection is any of: a port, a router, a network, and a switch.

16. The system of claim 10, wherein the system is further configured to:
query a vulnerability scanner based on the analyzed behavior and configuration of the medical device, wherein the currently exploitable vulnerability is detected based further on a response of the vulnerability scanner to the query.

17. The system of claim 10, wherein each classifier is trained to output a class and a confidence score, wherein the class output by each sub-model is determined based on the class and the confidence score output by each classifier of the sub-model.

* * * * *